US010530743B2

(12) United States Patent
Feinleib et al.

(10) Patent No.: US 10,530,743 B2
(45) Date of Patent: Jan. 7, 2020

(54) SYSTEM AND METHOD FOR DOMAIN MANAGEMENT AND MIGRATION

(71) Applicant: III Holdings 1, LLC, Wilmington, DE (US)

(72) Inventors: David A. Feinleib, Palo Alto, CA (US); R. Alan Burnett, Bellevue, WA (US)

(73) Assignee: III Holdings 1, LLC, Wilmington, DE (US)

( * ) Notice: Subject to any disclaimer, the term of this patent is extended or adjusted under 35 U.S.C. 154(b) by 196 days.

(21) Appl. No.: 15/418,988

(22) Filed: Jan. 30, 2017

(65) Prior Publication Data
US 2017/0142061 A1 May 18, 2017

Related U.S. Application Data

(62) Division of application No. 14/539,313, filed on Nov. 12, 2014.

(60) Provisional application No. 61/903,355, filed on Nov. 12, 2013.

(51) Int. Cl.
H04L 29/12 (2006.01)
H04L 29/08 (2006.01)
H04L 12/24 (2006.01)

(52) U.S. Cl.
CPC ......... H04L 61/1552 (2013.01); H04L 41/00 (2013.01); H04L 61/1511 (2013.01); H04L 61/302 (2013.01); H04L 67/02 (2013.01); H04L 67/06 (2013.01); H04L 67/1095 (2013.01); H04L 67/306 (2013.01)

(58) Field of Classification Search
CPC ............ H04L 61/1511; H04L 61/1552; H04L 61/302; H04L 41/00; H04L 67/02; H04L 67/06; H04L 67/1095; H04L 67/306
See application file for complete search history.

(56) References Cited

U.S. PATENT DOCUMENTS

| 6,901,436 | B1 | 5/2005 | Schneider | |
|---|---|---|---|---|
| 8,069,218 | B1* | 11/2011 | Tormasov | G06F 9/4856 709/212 |
| 8,898,402 | B1* | 11/2014 | Stronge | G06F 3/0605 711/100 |
| 10,361,802 | B1* | 7/2019 | Hoffberg-Borghesani | H04H 60/33 |
| 2004/0199608 | A1 | 10/2004 | Rechterman | |
| 2006/0036715 | A1* | 2/2006 | Ghattu | H04L 67/125 709/220 |
| 2007/0053513 | A1* | 3/2007 | Hoffberg | G06K 9/00369 380/201 |
| 2007/0067395 | A1* | 3/2007 | Blinn | G06Q 10/107 709/206 |
| 2007/0067396 | A1* | 3/2007 | Blinn | G06Q 10/107 709/206 |
| 2008/0005127 | A1 | 1/2008 | Schneider | |
| 2008/0046340 | A1* | 2/2008 | Brown | G06F 21/33 705/26.41 |

(Continued)

Primary Examiner — Davoud A Zand
(74) Attorney, Agent, or Firm — Brundidge & Stanger, P.C.

(57) ABSTRACT

A system and method for managing domain registrations across multiple domain registrars, and for migrating domains from one or more server computers to one or more other server computers. More specifically but not exclusively, disclosure relates to software processes, algorithms, and protocols for the management and movement of domains, as accessed across a network.

19 Claims, 14 Drawing Sheets

(56) References Cited

U.S. PATENT DOCUMENTS

2008/0091663 A1   4/2008  Inala
2011/0289417 A1*  11/2011 Schaefer ............. G06F 11/1458
                                                     715/735
2014/0143331 A1   5/2014  Smith

* cited by examiner

200

260

300

400

500

548

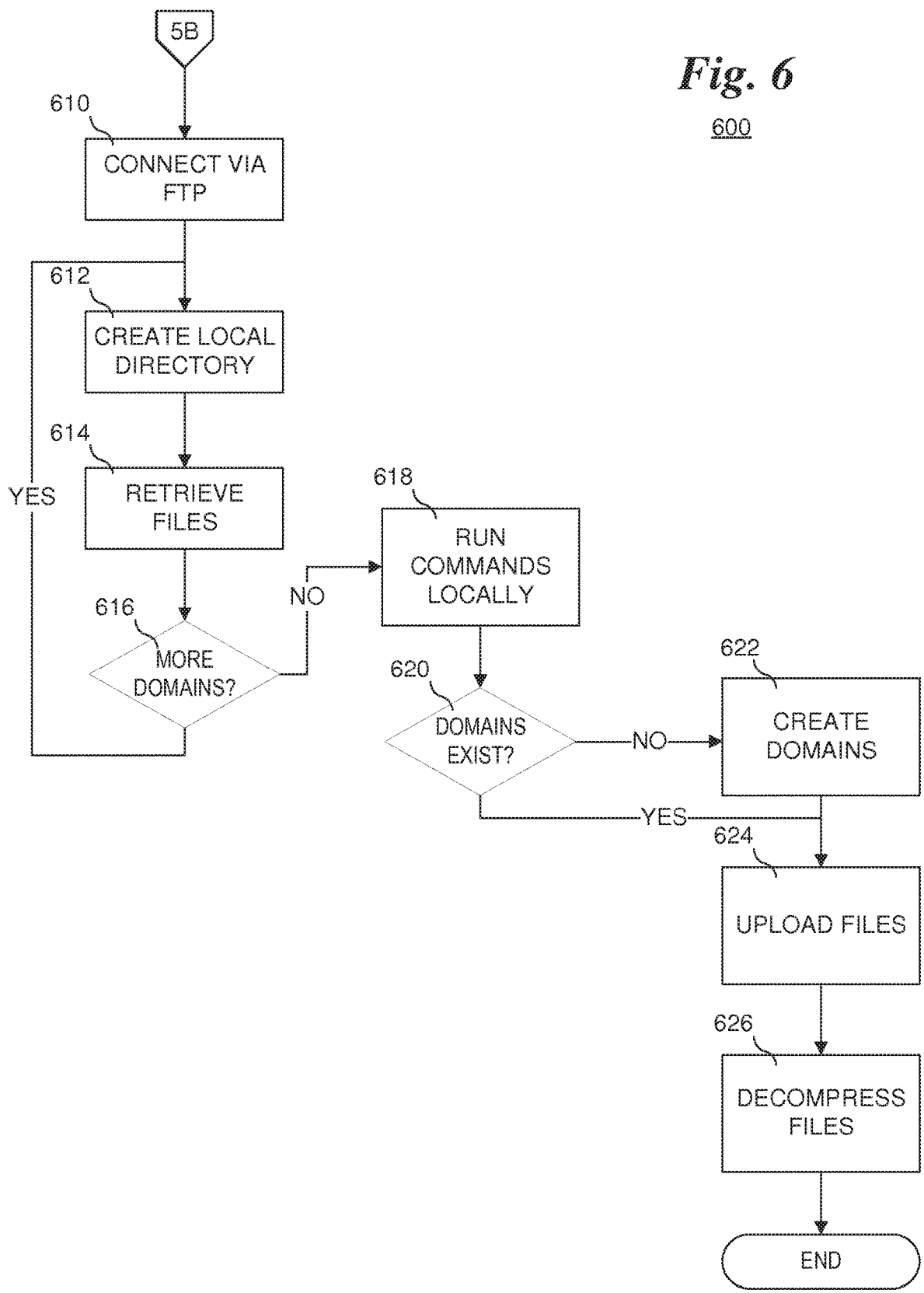

| Domain Name | Expiration Date | DNS Information | Registrar |
|---|---|---|---|
| DOMAIN1.COM | 10/12/2007 [Renew] | ns1.domain1.com | GoDaddy.com |
| DOMAIN2.COM | 09/28/2007 [Renew] | ns1.domain2.com | Register.com |
| DOMAIN3.COM | 11/05/2007 [Renew] | ns1.domain3.com | Dotster.com |
| DOMAIN4.COM | 11/05/2007 [Renew] | ns1.domain4.com — 702 | GoDaddy.com |

700

| Domain Name | Expiration Date | DNS Information | Registrar |
|---|---|---|---|
| DOMAIN3.COM | 11/05/2007 [Renew] | ns1.domain3.com | Dotster.com |
| DOMAIN1.COM | 10/12/2007 [Renew] | ns1.domain1.com | GoDaddy.com |
| DOMAIN4.COM | 11/05/2007 [Renew] | ns1.domain4.com | GoDaddy.com |
| DOMAIN2.COM | 09/28/2007 [Renew] | ns1.domain2.com | Register.com |

704

712   714   716   718

| GODADDY | REGISTER.COM | DOTSTER | ADD... |
|---|---|---|---|
| DOMAIN1.COM | 10/12/2007 [Renew] | ns1.domain1.com | |
| DOMAIN4.COM | 11/05/2007 [Renew] | ns1.domain4.com | |

720

710

```
<username>fredsmith</username>
<password>0202Pa46</password>
<command>renew</command>
<domain>www.domain1.com</domain>
```

724

DNS INFORMATION
Domain Name: DOMAIN4.COM
Name Server 1: ns1.domain4.com  IP: 245.38.35.19
Name Server 2: ns2.domain4.com  IP: 245.38.35.19

[REVERT]   [UPDATE]

SYSTEM AND METHOD FOR DOMAIN MANAGEMENT AND MIGRATION

CROSS-REFERENCE TO RELATED APPLICATIONS

This application is a Divisional under 35 U.S.C. § 120 of U.S. patent application Ser. No. 14/539,313, filed on Nov. 12, 2014, which Claims Priority from Provisional Application 61/903,355, filed on Nov. 12, 2013. The disclosures of both applications are hereby incorporated herein by reference in their entireties.

FIELD OF THE INVENTION

The field of invention relates generally to a system and method for managing domain registrations across multiple domain registrars, and for migrating domains from one or more server computers to one or more other server computers. More specifically but not exclusively, the invention relates to software processes, algorithms, and protocols for the management and movement of domains, as accessed across a network.

BACKGROUND INFORMATION

In recent years the number of domains has grown significantly. Some estimates put the total number of top level domains worldwide, as of March, 2006 at more than 65 million. A domain is a name, such as "www.company.com", by which a computer connected to the Internet is identified. In this example, "www" indicates the domain is a World Wide Web address, "company" is the name of the company to which the domain is registered, and ".com" indicates that the domain belongs to the ".com" group of commercial domains. Other extensions besides ".com" include ".org", ".edu", ".info" and so on. More recently, 700 new domain extensions have been announced to be available in the near future.

Domain names are the human readable analog to Internet Protocol (IP) addresses, such as "256.112.10.1". To be usable, a domain must be registered with one of the numerous accredited domain name registrars, such a "Godaddy.com" or "Register.com". A user desiring to use a particular domain name typically goes to the web site of one of these registrars, finds a desired available domain name and purchases the domain name. The user then owns the rights to that domain name for a particular period of time, typically, one, two, five, or ten years; the domain registrar lists the domain with the domain authority for the particular domain group. The domain may then be maintained by the user via the web based interface of the registrar with whom which the domain was registered. Some domain name owners register hundreds, thousands, or tens of thousands of domains in the hope that they will be able to make money from the domains by placing advertising on them, or by selling the domains in the future.

Alternatively, a prospective domain name owner may purchase the rights to a domain name on an after-market, auction, or domain selling site, such as "Afternic.com", "Snapnames.com", or "Pool.com", obtaining the rights to the domain from another owner. When a purchase occurs, the rights to the domain transfer to the new owner in exchange for money, while the domain registration and record itself remains with the domain registrar where the domain was registered.

As a result, the owners of domains often end up with tens or hundreds of domains registered with different registrars. Because domains typically expire on the one year, two year, five year, or ten year anniversary of their registration date, the owner of numerous domains must deal with the numerous different interfaces and accounts of the registration management systems of different registrars. Working with these interfaces can be cumbersome and difficult, while trying to manage domains across multiple registrars can lead to confusion, resulting in a failure to renew a domain before it expires, causing the loss of one or more valuable domain names. The solution to the aforementioned problem is the subject of the present invention.

Many owners of domains host their domains, that is, put the web pages for the web sites that their domain names point to, on servers at a remote location connected to the Internet. "Godaddy.com" is an example of one company that provides both registration services and hosting; Dreamhost is another company that provides hosting services. Hosted servers are typically managed by a company, with a user paying a monthly or yearly fee to the company that owns the servers in exchange for access to the server for a particular period of time, such as a month or a year. The hosting company typically sets up and maintains the server, and often provides additional services such as installing special software, checking for security holes, and updating software, for an additional fee. Thus, in the aforementioned example, a user with multiple web sites may have a web site located on a plurality of Godaddy.com hosted servers, as well as on a plurality of Dreamhost hosted servers, as well as on the servers of other hosting companies.

From time to time, a purchaser of such hosting services desires to migrate web sites from one machine to another. There are a number of cases in which such a purchaser would want to migrate web sites from one machine to another. One case is when a machine on which web sites are running becomes out of date. Another case is when a machine for which a purchaser has paid for a particular period of time, such as a year, comes up for renewal. In this case, the hosting provider often charges more for a renewal of the existing machine than for the purchase of a new machine (often with newer and better hardware), because the hosting provider knows that it is difficult for the purchaser to switch machines. The present invention also solves the aforementioned problem.

SUMMARY OF THE INVENTION

In accordance with aspects of the present invention, a system and method is described for managing domain registrations across multiple domain registrars. In another aspect of the present invention, a system and method is described for migrating domains from one or more server computers to one or more other server computers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5b is a flowchart showing a continuation of the process from FIG. 5a.

FIG. 6 is a flowchart showing a continuation of the process from FIG. 5b.

FIG. 7 is a visual representation of the interface for displaying information about domain registrations retrieved from a plurality of domain registrars.

FIG. 11b is a rear isometric view of the blade server chassis of FIG. 11a.

DETAILED DESCRIPTION

Embodiments of methods and apparatus for domain management and migration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
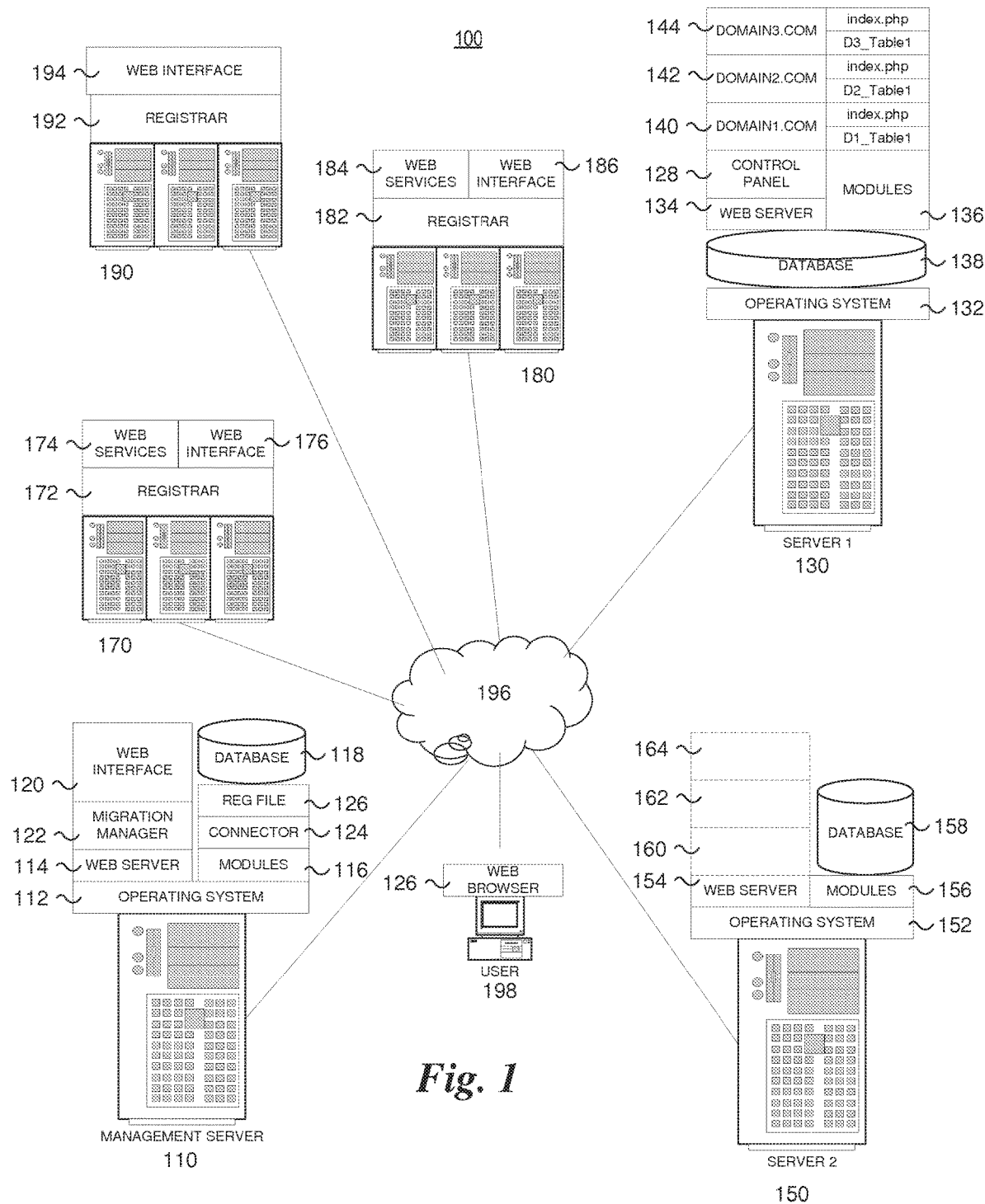
FIG. 1 is a schematic drawing of the system for domain management and migration.

FIG. 1 illustrates an exemplary domain management and migration system 100. System 100 includes management server 110, hosted server 130, hosted server 150, and domain registrars 172, 182, and 192. Management server 110 includes operating system 112, which represents any of a wide variety of commonly available operating systems such as, by way of example and without limitation, Red Hat Enterprise Linux from Red Hat, Inc., web server software 114, which represents any of a wide variety of web server products such as the Apache Web Server from the Apache Server Foundation, additional modules 116, database 118, which represents any of a wide variety of databases, such as a database implemented through MySQL, from MySQL Corporation, web interface 120, through which users view and manage domains, and migrate web sites, databases, and settings between servers, and migration manager 122, which is implemented in PHP, a widely used general-purpose scripting language supported by The PHP Group. Web interface 120 of management server 110 is accessed over the Internet 196, by a user on a desktop PC 198 running web browser 126, which represents a wide variety of commonly available web browsers such as Internet Explorer 8, 9 or 10 from Microsoft Corporation, Google Chrome, Mozilla Firefox, Apple Safari, Mobile Safari, Android Browser, and Mobile Chrome, etc.

Hosted server 130 includes operating system 132, web server 134, modules 136, database 138, and a plurality of domains, "DOMAIN1.COM" 140, "DOMAIN2.COM" 142, and "DOMAIN3.COM" 144. Hosted server 150 includes operating system 152, web server 154, modules 156, database 158, and, after the migration process described below completes, domains 160, 162, and 164.

Domain registrar 172 includes registration servers 170, web services interface 174 and web interface 176. Likewise, domain registrar 182 includes servers 180, web services interface 184, and web interface 186. Domain registrar 192 includes servers 190, and web interface 194.

Figure 2A:
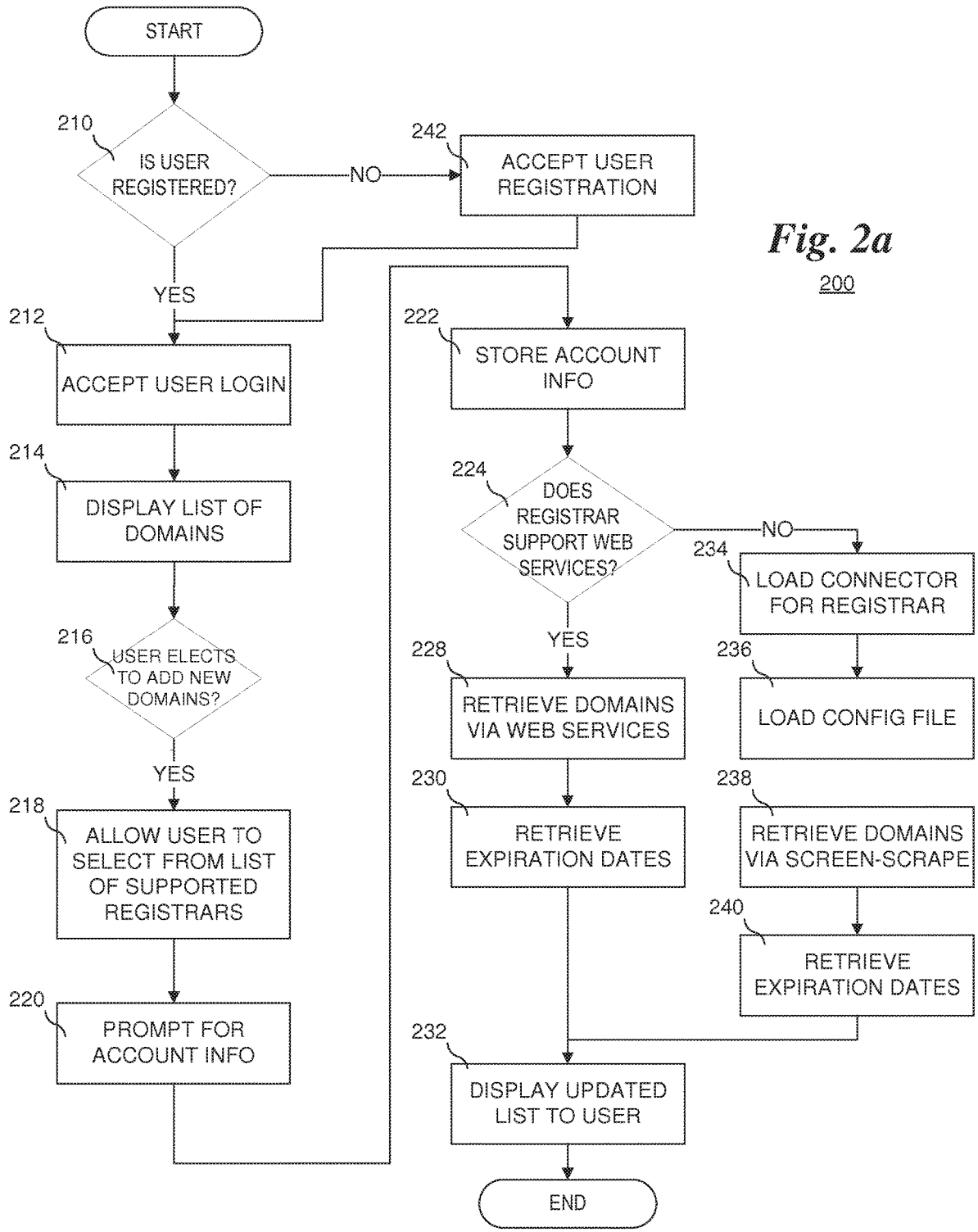
FIG. 2a is a flowchart illustrating the process for centralized management and viewing of domains and associated registration information across a plurality of domain registrars.

According to one implementation of the invention, as shown in FIG. 2a, drawing 200, if the user is not yet registered to use migration manager 122 (decision point 210), migration manager 122 allows the user to register (operation 242) via web interface 120. If the user is already registered, then migration manager 122 accepts a user login (operation 212) from the user of computer 198 via web interface 120 served by web server 114 to web browser 126 over the Internet 196.

Via web interface 120, migration manager 122 displays the list of domains stored in database 118 for the user of computer 198, (operation 214) associated with the user's accounts on domain registrars 172, 182, or 192. If the user choose to add new domains (decision point 216), then web interface 120 allows the user to choose a domain from a dropdown list of supported domain registrars (operation 218). Migration manager 122 prompts the user for account information (operation 220) and stores the account information received from the user in database 118.

Migration manager 122 on management server 110 supports two methods for retrieving domain registration information from registrars 172, 182, and 192. If the registrar supports a web services interface (decision pint 224), that is, a method for programmatically processing a request for domain registration information via XML over the HTTPS protocol, as with registrars 172 and 182, then migration manager 122 interfaces with web services interfaces 174 and 184 respectively to retrieve domain registration information via web services (operation 228). Migration manager 122 also retrieves the expiration dates of each domain from the supported registrar and displays the list of domain registrations as shown in drawing 700 of FIG. 7.

Alternatively, if the domain registrar does not support a web services interface, as with domain registrar 192, migration manager 122 loads screen-scraping module 124 from modules 116 to interface with domain registrar 192 (operation 234). Module 124 loads file 126 (operation 236) containing data specifically describing the web interface of registrar 192. In the instant implementation, screen-scraping module 124 mimics a user interfacing with domain registrar 192; module 124 parses received web pages looking for specific tag words and phrases including "account", "username", "password", and "domain name", based on the registrar-specific data in file 126. Module 124 transmits user account name and password to servers 190 of registrar 192 over network 196; module 124 parses the page that is returned by servers 190 (operation 238) and additionally retrieves the expiration date of each domain (operation 240), displaying the returned domain data to the user via web interface 120 (operation 232); the domain data appears in unified interface 700 of FIG. 7 on the web browser 126 of user's computer 198.

Figure 2B:
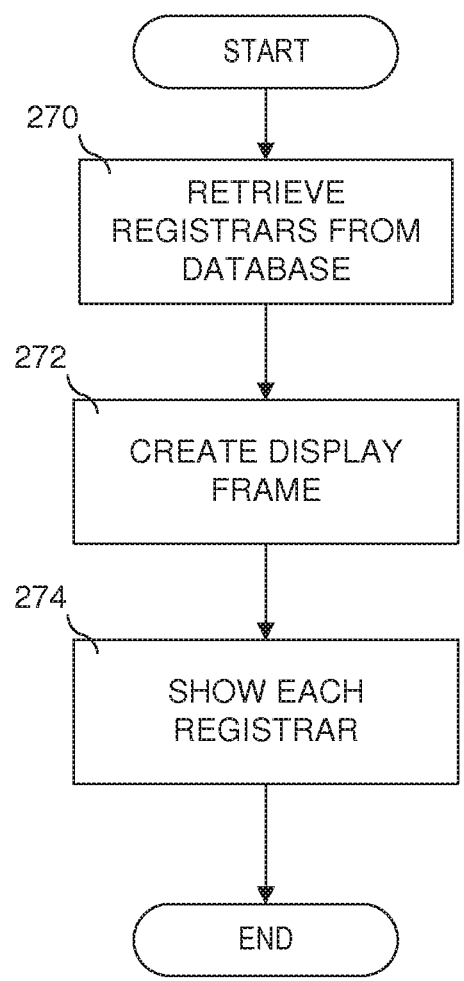
FIG. 2b shows an alternative embodiment for displaying the web interfaces of a plurality of domain registrars via a unified display interface.

In an alternative embodiment, as shown in FIG. 2b, drawing 260, migration manager 122 neither interfaces with registrars 172, 182 and 192 via a web interface nor via screen-scraping. Instead, migration manager 122 retrieves a list of registrars from database 118 (operation 270), creates a display frame (operation 272) for each registrar, and displays registrar specific information in display pane 720 (operation 274) accessible via individual tabs 712, 714, and 716 inside web interface 120.

Figure 3:
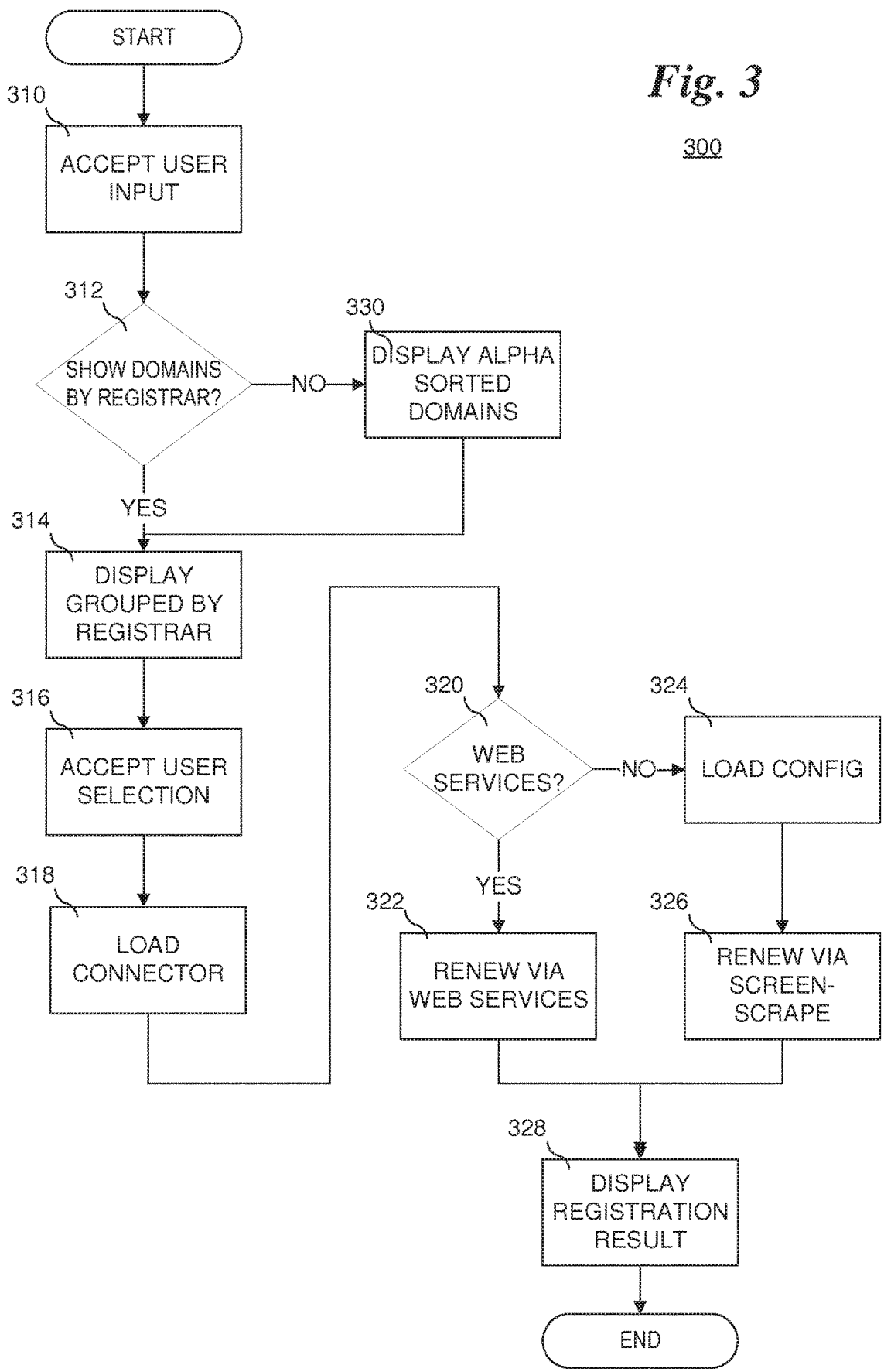
FIG. 3 is a flowchart illustrating the process for renewing a plurality of domains on different registrars.

As shown in FIG. 3, drawing 300, a plurality of domain names can be displayed in multiple ways and renewed via a unified interface. Migration manager 122 accepts input from the user (operation 310) indicating whether to display domains sorted by domain name or by registrar (decision point 312). If the user elects to view domain names sorted alphabetically by domain name, migration manager 122 displays via web interface 120 the domains associated with the user's account into web browser 126 (operation 330), as shown in FIG. 7 drawing 700. If the user chooses to view domain names by registrar, migration manager 122 displays via web interface 120 the domains associated with the user's account into web browser 126 sorted by registrar name (operation 314) as shown in FIG. 7 drawing 704.

Migration manager 122 waits for the user to choose to renew a domain name and accepts the user selection of which domain name to renew (operation 316). Migration manager 122 loads the connector for the specified domain (operation 318) and the connector determines if the registrar for the selected domain name can be renewed via web services (programmatic) interface 176 or 186 of registrars 172 and 182 respectively. If the registrar supports a web services interface (decision point 320), migration manager 122 sends an XML over HTTPS command to the specified registrar, e.g. registrar 172, containing the username and password of the user account for the specified registrar and the name of the domain to renew, as shown in FIG. 7 drawing 724 (operation 322). If the registrar does not support a web services interface, as is the case with registrar 192, migration manager 122 loads configuration file 126 and renews the specified domain via screen-scraping (operation 326). The result of the renewal attempt is displayed to the user of computer 198 via web interface 120 in browser 126 via the Internet 196 (operation 328).

Figure 4:
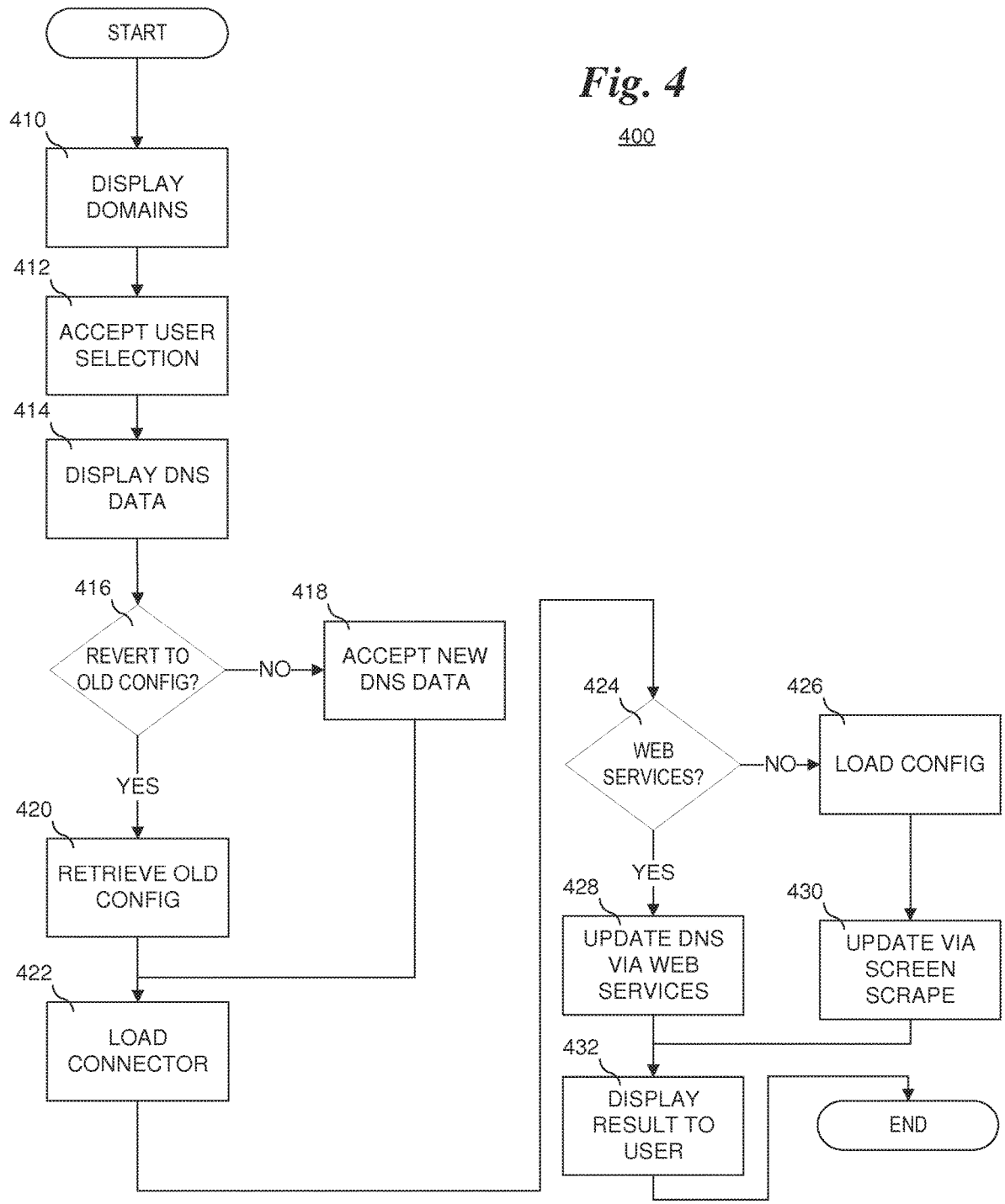
FIG. 4 is a flowchart illustrating the process for modifying the DNS settings for a domain at a supported registrar.

As shown in FIG. 4, drawing 400, migration manager 122 supports the updating of Domain Name System (DNS) data on supported registrars or reversion to old DNS data if selected by the user for a given domain name. Migration manager 122 retrieves a list of domains associated with the user's account and displays them to the user (operation 410) via web interface 120. Migration manager 122 waits for the user to choose one of the domains for DNS updating by clicking on the DNS information for a particular domain as shown in FIG. 7 hyperlink 702, and then displays the DNS data for the selected domain (operation 414), as shown in FIG. 7 drawing 730, which shows the domain name and two name server names and their IP addresses in a popup window. If the user chooses to revert to an old DNS configuration (decision point 416), migration manager 122 retrieves the old DNS configuration data for the specified domain from database 118 (operation 420). If the user chooses to provide new DNS data, migration manager 122 receives the new DNS information via web interface 120 presented in web browser 126 over the Internet 196 (operation 418). Migration manager 122 loads connector 124 which determines whether the registrar associated with the domain for which DNS information is to be renewed supports a web services interface (decision point 424); if the registrar, e.g. registrar 172 supports a web services interface 174, the DNS information for the specified domain is updated via web services interface 174 (operation 428). If not, as in the case of registrar 192, connector 124 loads configuration file 126 and updates the DNS information via web interface 194 of registrar 192 (operation 430). The result of the DNS update attempt (either success or failure) is displayed to the user (operation 432), completing the process.

Figure 5A:
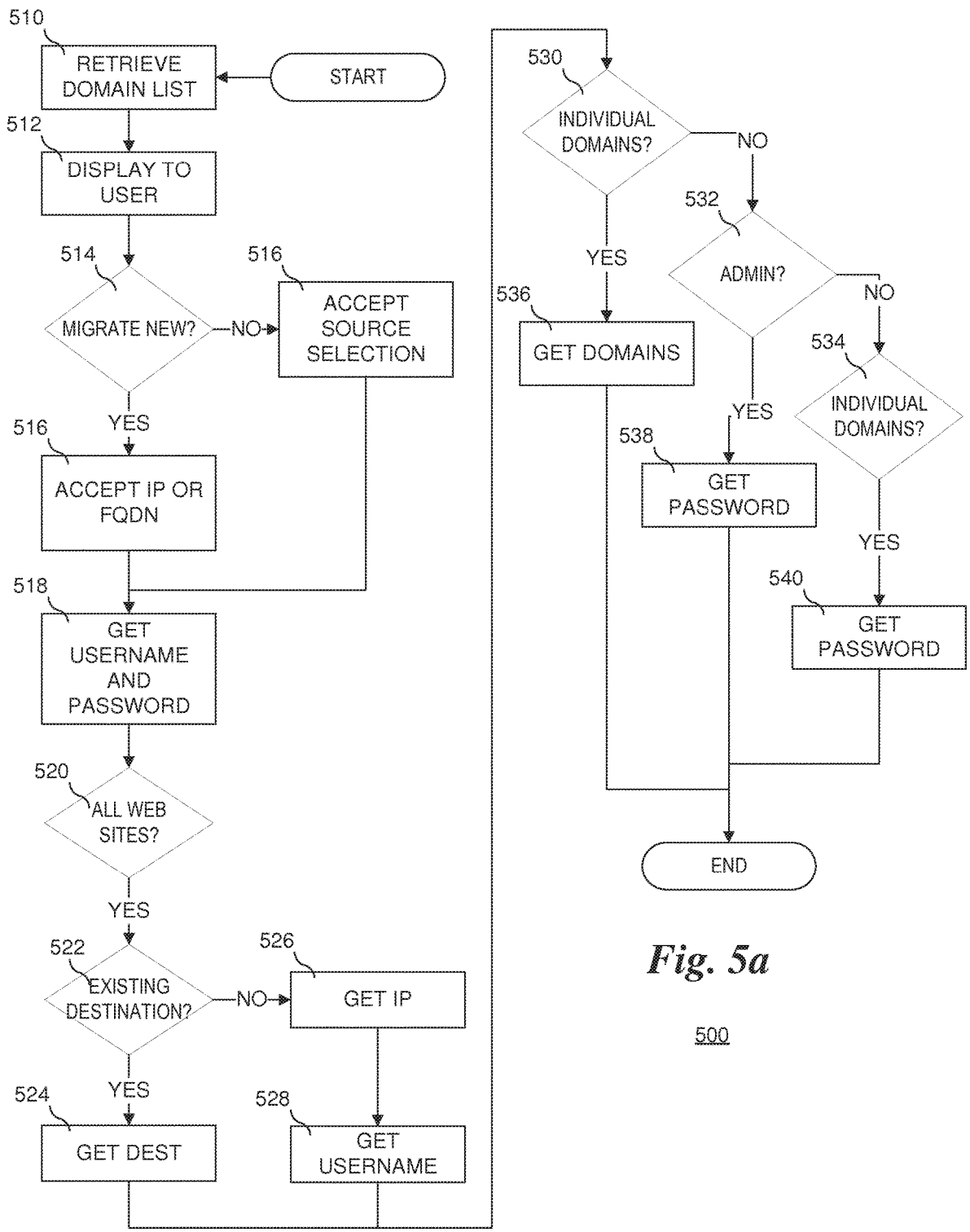
FIG. 5a is a flowchart illustrating the process for determining and displaying the differences between two server configurations, for migrating the files and database tables associated with a web site from one server machine to another server machine, and for updating associated DNS settings.

As shown in FIG. 5, drawing 500, migration manager 122 migrates domains including web site related files and database tables from server 130 to server 150, automating what prior to the instant invention was a tedious manual process for system administrators. Migration manager 122 retrieves a list of domains for the user from database 118 (operation 510) and displays them to the user (operation 512). If the user chooses to migrate an existing domain (that is, one that exists in database 118), then migration manager 122 accepts the source selection from the displayed list in web interface 120 (operation 516) otherwise migration manager 122 accepts via web interface 120 the IP address (such as 224.38.12.18) or fully qualified domain name (FQDN) of a web site such as DOMAIN1.COM 140 hosted on server 130, from which migration manager 122 deduces the IP address of web site 140 (operation 516).

Migration manager 122 allows the user of computer 198 interacting with migration manager 122 to migrate all the web sites on server 130 or individual web sites, e.g. site 140. Migration manager 122 thus accepts a username and password specific to "DOMAIN1.COM" 140 from the user of computer 198, or a username and password that grants access to multiple or all web sites of server 130 (operation 518).

In the case where migration manager 122 receives indication from the user to migrate all web sites 140, 142 and 144 on server 130 to server 150 (decision point 520), the following process ensues. Migration manager 122 first accepts input from the user of computer 198 indicating destination server 150 to which sites 140, 142 and 144 are to be migrated; that is, migration manager via web interface 120 allows the user of computer 198 via browser 126 over network 196 to select an existing server displayed in interface 120 (operation 524) or to add a new server (decision point 522), inputting IP address or domain name (operation 526), username and password information for the new server (operation 528).

Figure 5B:
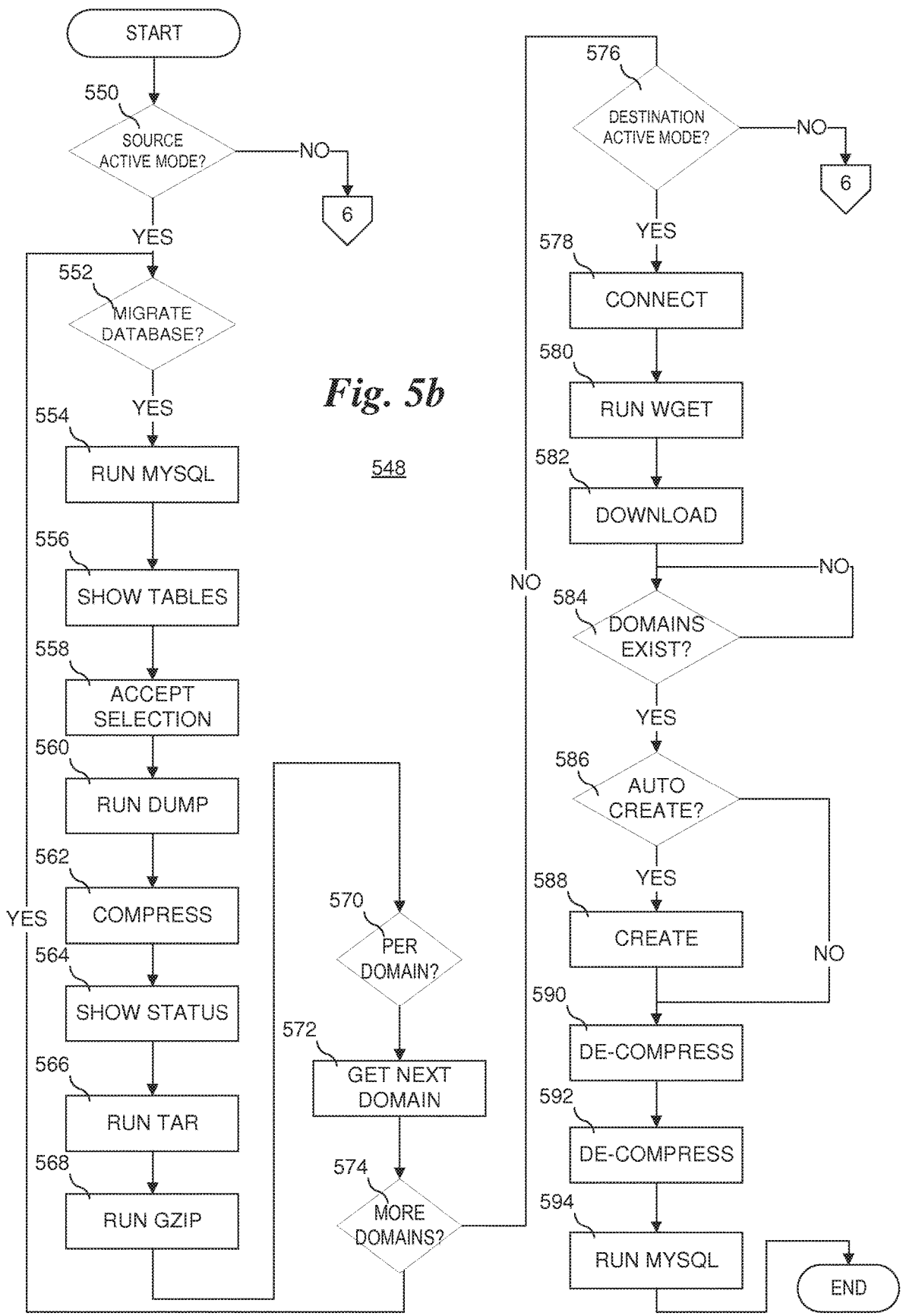

Continuing in FIG. 5b, drawing 548, migration manager 130 supports three ways of detecting the domains available on server 130 for migration. One way (decision point 530) is that migration manager 122 accepts via manual input into web interface 120 from the user the list of individual domains with associated usernames and passwords (operation 536); a second way (decision point 532) is that the user provides an administrative username and password that allows migration manager 122 to access all domains on server 130 (operation 538); a third way (decision point 534) is via screen-scraping interfacing with web-based control pane 1128 of server 130, which web-based control pane 1128 represents a wide variety of common server control panel software programs including Plesk and cPanel; migration manager 122 accepts via web interface 120 the username, password and IP address of control panel interface 128 of server 130, then accesses control panel 128 and scrapes the domain data from control panel 128 (operation 540). Migration manager accepts from the user via web interface 120 the selection of domain detection mechanism (decision points 530, 532, 534).

Migration manager 122 supports two migration modes: active migration mode and passive migration mode. Both modes are supported on a per-domain or per-server basis. In active mode, migration manager 122 has sufficient access privileges to perform various actions directly on source server 130. In passive mode, migration manager 122 does not have sufficient privileges and therefore relies on downloading files via File Transfer Protocol (FTP).

Migration manager 122 waits for the user to initiate the migration process; once the process is initiated, migration manager 122 accepts input from the user of computer 198 indicating whether to run in active or passive mode (decision point 552), and whether to migrate files only or the structure and content of the tables contained in database 138 as well. Migration manager 122 also accepts input from the user indicating whether the configuration of cronjobs (that is, scheduled tasks) should be migrated.

Running on a per-server basis, in active migration mode, migration manager 122, having sufficient privileges on server 130 accesses server 130 via a secure shell connection. If the user has indicated that migration manager 122 should migrate database tables (decision point 552), then migration manager 122 runs the "mysql" command (operation 554), providing the root username and password supplied by the user, and returns over network 196 a list of database tables to the user of computer 198 via web interface 120 (operation 556). That is, web application 122 receives a list of tables back, presents them via interface 120 to the user of computer 198. Migration manager 122 accepts input (operation 558) from the user indicating which tables to migrate and then runs the mysql "dump" command (operation 560) with the user-selected tables, causing the creation of a database dump file. Migration manager 122 then runs the "tar" and "gzip" commands to compress the file for transfer (operation 562).

Having completed the database dump process, migration manager 122 indicates via interface 120 to the user that the migration process is proceeding to the file processing operation (operation 564). Migration manager 122 changes to the highest accessible directory, and then, recursively, for each "httpdocs" sub-directory found executes the "tar" command (operation 566) to wrap all the files associated with domain 140 into a single file, the name of which is the name of the domain with a .tar.gz extension; it then runs the "gzip" command to compress the "tar" file (operation 568). Migration manager 122 thus produces three files on server 130, DOMAIN1.COM.tar.gz; DOMAIN2.COM.tar.gz, and DOMAIN3.COM.tar.gz.

Running on a per-domain basis (decision point 570), in active migration mode, migration manager 122 accesses each domain of server 130 (operation 572), that is domains 140, 142, and 144, repeats the aforementioned database dump process (decision point 574), and runs the "tar" command in the "httpdocs" directory, creating a file, the name of which is the name of the domain with a .tar.gz extension. For DOMAIN1.COM 140, the resulting file is DOMAIN1.COM.tar.gz; for DOMAIN2.COM 142, it is DOMAIN2.COM.tar.gz and for DOMAIN3.COM 144 it is DOMAIN3.COM.tar.gz.

If the target of the migration process is also accessible via active mode (decision point 576) (that is, migration manager 122 has sufficient permissions to run necessary commands), then migration manager 122 connects to server 150 via a secure shell connection (operation 578). Migration manager 122 executes the "wget" command (operation 580) providing the IP address, username, and password of server 130; it then scripts the "wget" command causing it to download (operation 582) the compressed database file, as well as the per-domain ".tar.gz" files on server 130 to server 150. Migration manager 122 determines (decision point 584) if the target domains already exist on destination server 150 (that is, if they have already been created by the user); if they have not, then for any domains that do not yet exist (as determines by the existence of sub-directories named the domain name of the downloaded files), migration prompts the user to determine if the user wants to create the domains prior to proceeding or if migration manager should create the domains (decision point 586). If the user chooses to create the domains manually (e.g. outside the migration manager), migration manager waits until the user indicates the domains have been created, then checks for their existence and repeats if necessary. Alternatively, migration manager 122 creates the domains by creating the necessary subdirectories corresponding to the domains, that is DOMAIN3.COM, DOMAIN2.COM, and DOMAIN1.com (operation 588).

With the domains existing, migration manager 122 executes the "gunzip" and "tar-xvf" commands to first de-compress and then separate the tar file into its file components into the appropriate sub-domains for each file corresponding to the domain (operation 590). That is, "DOMAIN3.COM.tar.gz" is first de-compressed then un-tarred into the directory "www.domain3.com", filling slot 164. The process is repeated for each domain file, filling slots 162, and 160 respectively.

If database migration was selected by the user, migration manager 122 runs the "gunzip" and "tar" commands to decompress and separate the dump file from the tar container (operation 592). Migration manager 122 checks for the existence of the necessary databases in mysql by executing the "mysql" command. If the databases do not yet exist, migration manager 122 creates them and then imports the database dump file into the mysql database, creating a replicate of database 138 in database 158 (operation 594). The web site content and database tables of server 130 have now been migrated to server 150.

Continuing, in FIG. 6, drawing 600, in some cases, the user cannot or does not want to supply sufficient access rights to either server 150 or server 130. In this case, migration manager 122 operates in passive mode, using management server 110 as an intermediary storage location.

It is to be understood that one server can be operated in passive mode while the other is operated in active mode; both may be operated in active mode; or both in passive mode.

If management server 110 does not have sufficient access permissions on server 130 to operate in active mode, migration manager 122 operates in passive mode. In passive mode, migration manager 122 connects to server 130 using the File Transfer Protocol (FTP), using the domain name or IP address of the web site specified by the user for migration (operation 610). Migration manager 122 creates a local directory on management server 110 to store the files that will be downloaded from each domain (operation 612). Migration manager 122 changes to the remote "httpdocs" directory and uses the "mget" command to retrieve all files for the selected web site, downloading them to server 110 individually (operation 614). Migration manager 122 repeats this operation for each web site; that is, for DOMAIN2.COM 142 and DOMAIN1.COM 140 respectively, downloading the files into the selected local directory for the specified domain (decision point 616).

If migration manager 122 has sufficient privileges to access server 150 in active mode, then migration manager 122 runs the "tar" and "gzip" commands locally (on management server 110) so that migration manager 122 can upload fewer, compressed files to server 150, rather than one file at a time (operation 618). Migration manager 122 connects to server 150 and creates DOMAIN1.COM 160, DOMAIN2.COM 162, and DOMAIN3.COM 165 (operation 622), respectively, if they do not already exist (decision point 620) and the action to create the domains is approved by the user via a window prompt. Migration manager 122 then uploads the ".tar.gz" file for each domain to the "httpdocs" directory of the specified domain (operation 624). That is, for DOMAIN1.COM 160, migration manager 122 uploads a file called "DOMAIN1.COM.tar.gz" which contains all web site files for DOMAIN1.COM 140; migration manager 122 repeats the process for DOMAIN2.COM 162 and DOMAIN3.COM 164. Migration manager 122 then runs the commands previously described to un-zip and un-tar the files for each domain (operation 626).

Figure 8:
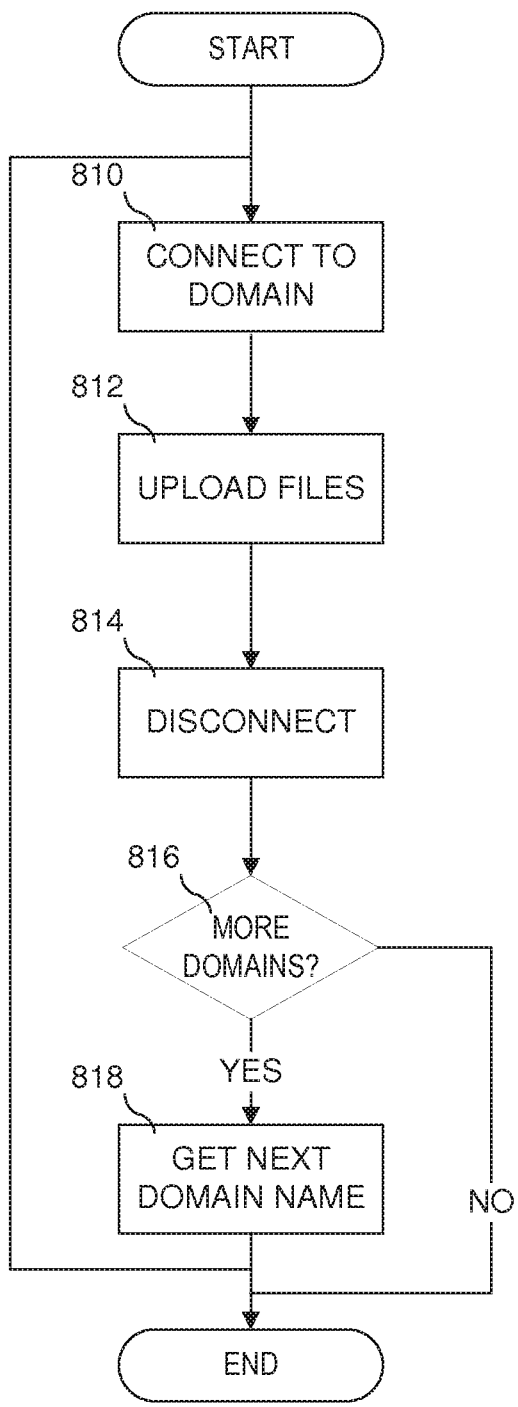
FIG. 8 is a flowchart showing the process for automatically uploading files for migration to a server.

In an alternative embodiment, as shown in FIG. 8, if server 150 cannot be accessed in active mode, and files were downloaded from server 130 in passive mode, then migration manager 122 runs in passive mode. In this mode, migration manager 122 connects to each domain 160, 162, and 164 one at a time (operation 810) and each file for each domain is uploaded individually from server 110 to server 150 via the File Transfer Protocol (operation 812). In this embodiment, DOMAIN1.COM 160, DOMAIN2.COM 162 and DOMAIN3.COM 164 must already exist on server 150, having been created by the user. After migration manager 122 has completed uploading the files for a given domain, it disconnects from the specified domain (operation 814) and checks if there are more domains for which files need to be uploaded (decision point 816). If there are more domains to be processed, then migration manager 122 gets the next domain name (operation 818) and repeats the process until there are no more domain names.

Figure 9:
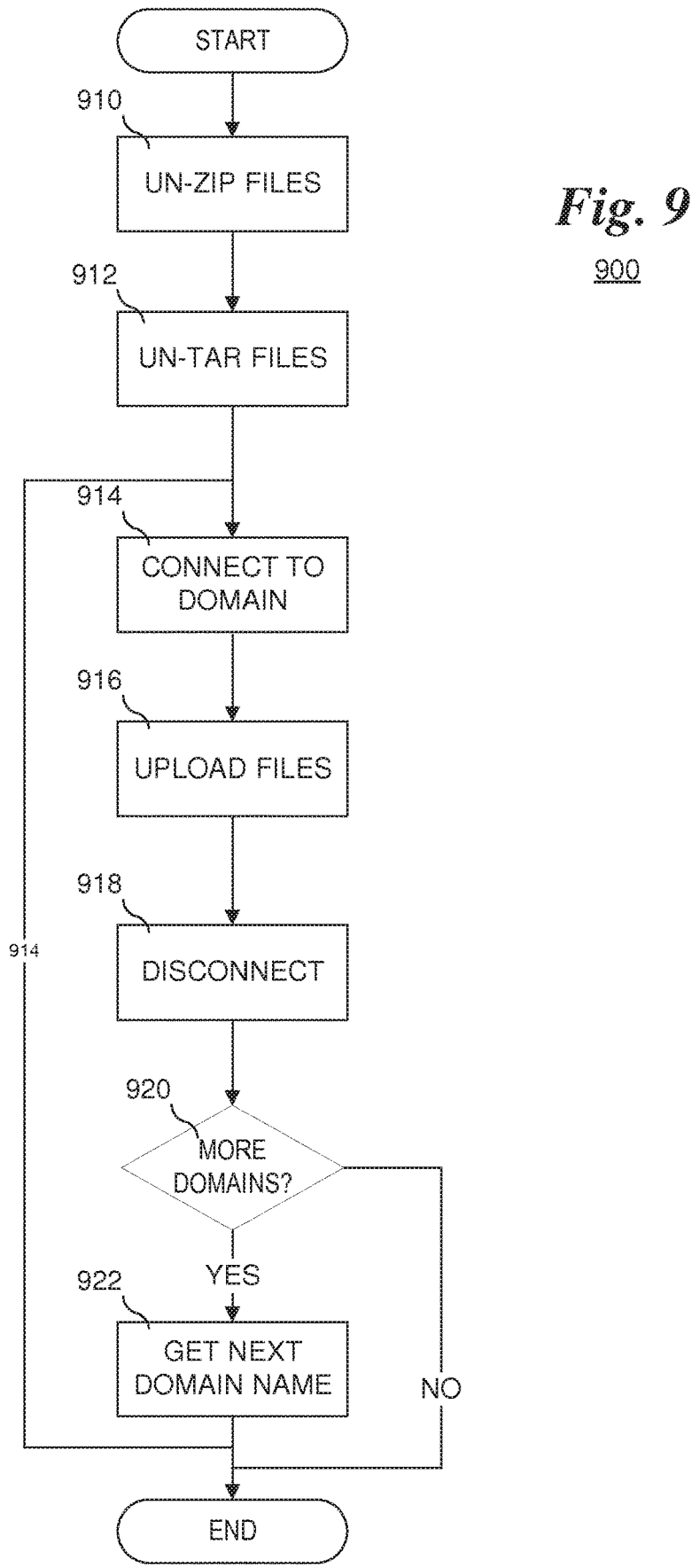
FIG. 9 is a flowchart showing the process for first de-compressing files locally before automatically uploading them to a server.

In an alternative embodiment shown in FIG. 9, drawing 900, if server 150 cannot be accessed in active mode, and files were downloaded from server 130 in active mode, then migration manager 122 runs in passive mode. Migration manager 122 first un-zips (operation 910) and un-tars (operation 912) all files for DOMAIN1.COM 140, DOMAIN2.COM 142, and DOMAIN3.COM 144 locally on server 110. Migration manager 122 then uses the File Transfer Protocol to connect to the first domain on server 150 (operation 914) and uploads the individual files to slot 160, corresponding to the first domain (operation 916) to be migrated. Migration manager 122 then disconnects from domain 160 and checks if there are more files for more domains to be uploaded (decision pint 920); if there are, then migration manager 122 gets the next domain name (operation 922) and repeats the process. The domains must already have been created by the user. This completes the migration process.

Figure 10:
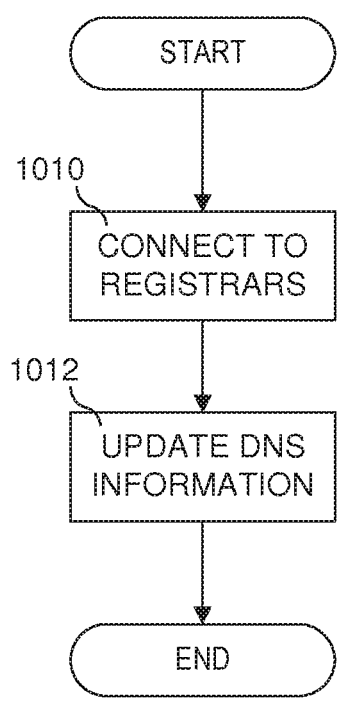
FIG. 10 is a flowchart showing the process for automatically updating DNS information once a migration has been completed.

With the migration process completed, in another implementation shown in FIG. 10, drawing 1000, migration manager 122 connects to registrars 172, 182, and 192 (operation 1010) and updates the Domain Name Services (DNS) information for each of domains 140, 142, and 144 to point to these domains 160, 162, and 164 respectively, on server 150 (operation 1012).

Exemplary Implementation Environment and Blade Server Architecture

It is envisioned that aspects of the embodiments herein may be implemented in vanous types of computing environments, including on-premise equipment such as computers and servers communicatively coupled via a LAN, as well as blade servers and modules employed in a data center and/or server farm environment, such as used for hosting cloud-based services. Typically, the servers used in data centers and server farms comprise arrayed server configurations such as rack-based servers including multiple server blades or modules. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 11a-c, and 12. Under a typical configuration, a rack-mounted chassis 1100 is employed to provide power and communication functions for a plurality of server blades (i.e., blades) 1102, each of which occupies a corresponding slot. (It is noted that all slots in a chassis do not need to be occupied.) In turn, one or more chassis 1100 may be installed in a blade server rack 1103 shown in FIG. 11c. Each blade is coupled to an interface plane 1104 (e.g., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 11A:
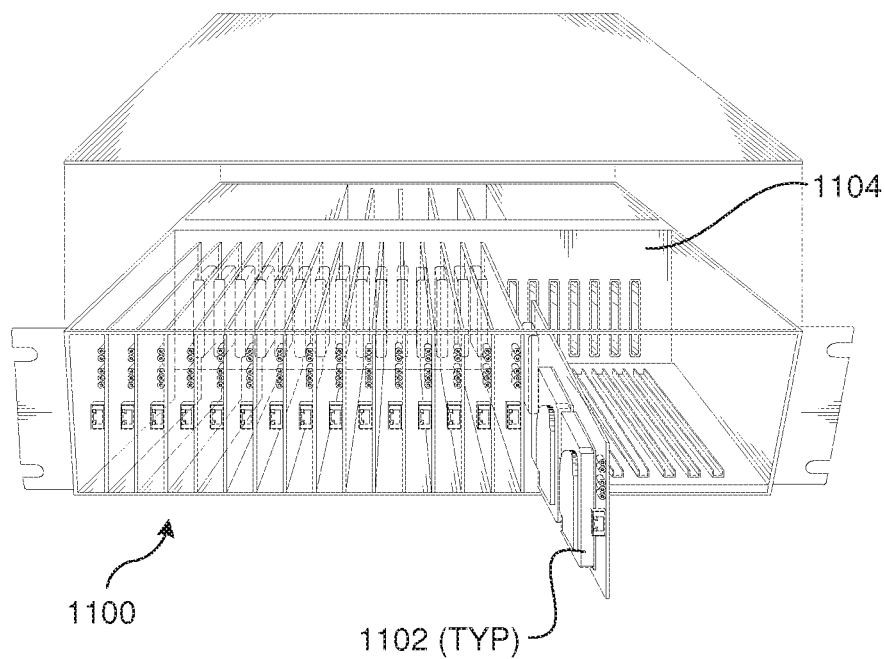
FIG. 11a is a frontal isometric view of an exemplary blade server chassis in which a plurality of server blades are installed.
Figure 11B:
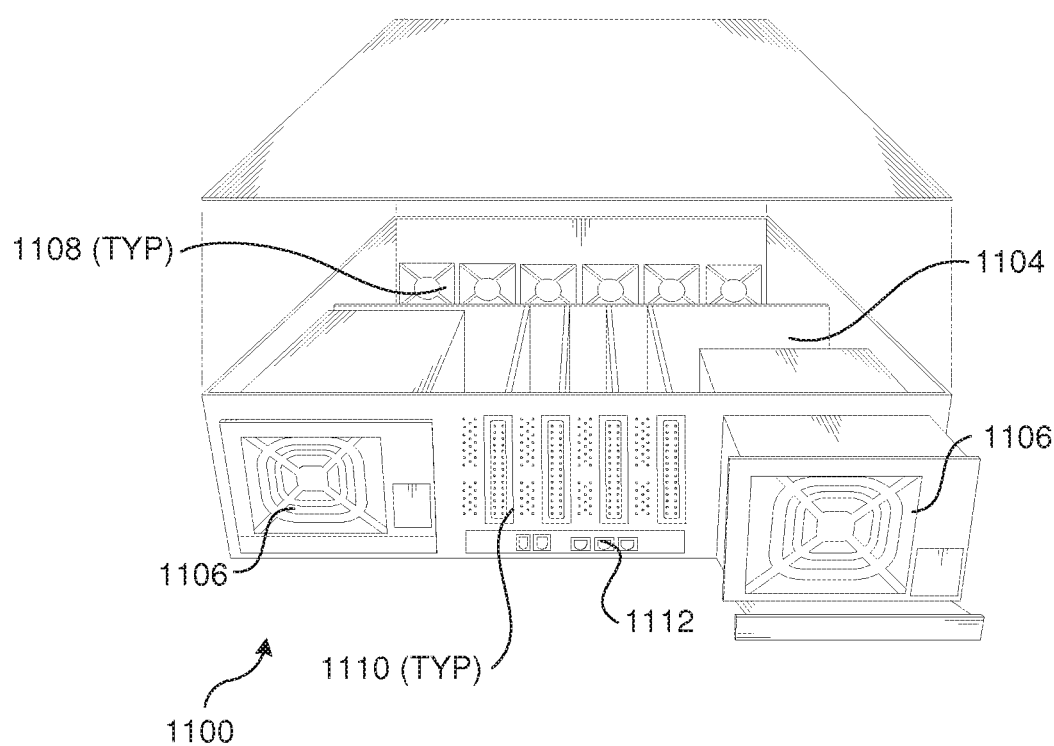
Figure 11C:
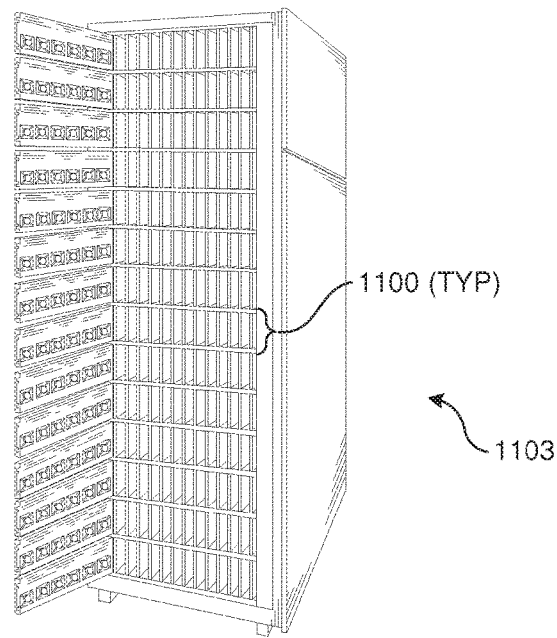
FIG. 11c is an isometric frontal view of an exemplary blade server rack in which a plurality of rack-mounted blade server chassis corresponding to FIGS. 11a and 11b are installed.

A typical mid-plane interface plane configuration is shown in FIGS. 11a and 11b. The backside of interface plane 1104 is coupled to one or more power supplies 1106. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1108 are employed to draw air through the chassis to cool the server blades.

An important feature required of all blade servers is the ability to communicate externally with other IT infrastructure. This is typically facilitated via one or more network connect cards 1110, each of which is coupled to interface plane 1104. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1112 that is coupled to the backside or front-side of the interface plane. As yet another option, a management or configuration server may be employed to manage blade activities, wherein communications are handled via standard computer networking infrastructure, for example, Ethernet.

Figure 12:
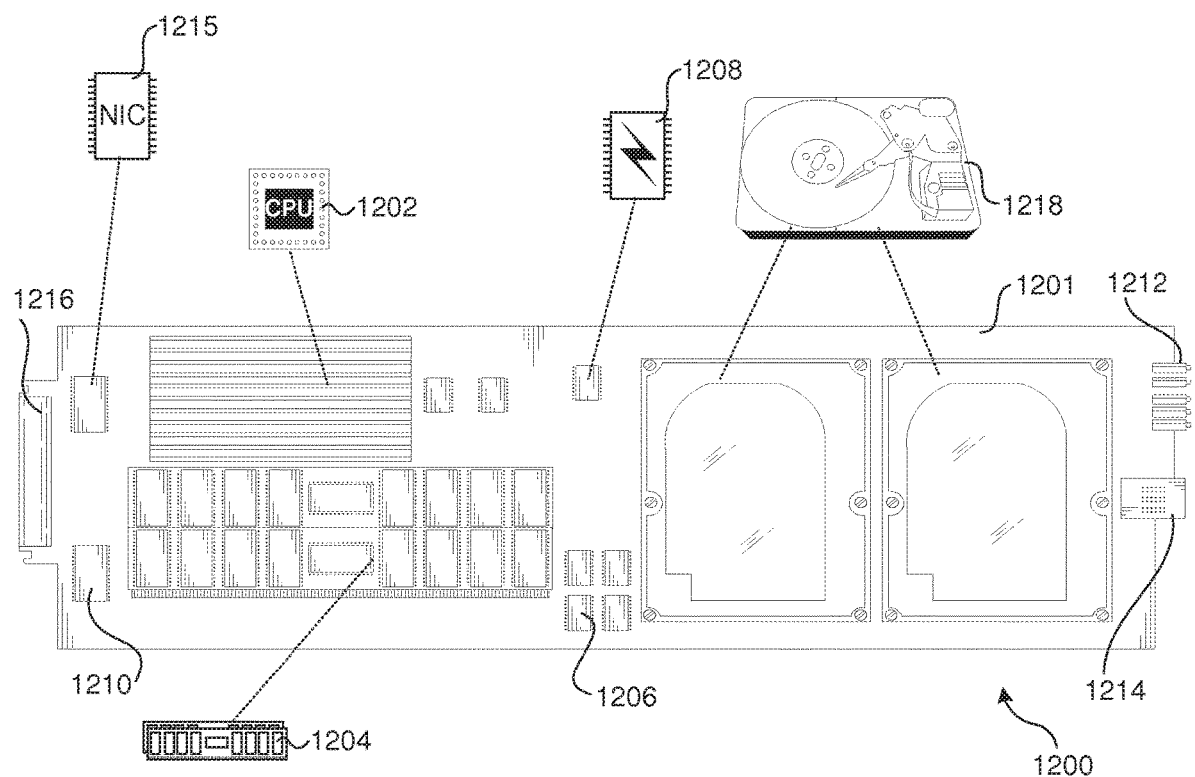
FIG. 12 shows details of the components of a typical server blade, according to one embodiment.

With reference to FIG. 12, further details of an exemplary blade 1200 are shown. As discussed above, each blade comprises a separate computing platform that is configured to perform server-type functions, i.e., is a "server on a card." Accordingly, each blade includes components common to conventional servers, including a main printed circuit board (main board) 1201 providing internal wiring (i.e., buses) for coupling appropriate integrated circuits (ICs) and other components mounted to the board. These components include one or more processors 1202 coupled to system memory 1204 (e.g., some form of Random Access Memory (RAM)), cache memory 1206 (e.g., SDRAM), and a firmware storage device 1208 (e.g., flash memory). A NIC (network interface controller) chip 1210 is provided for supporting conventional network communication functions, such as to support communication between a blade and external network infrastructure. Other illustrated components include status LED (light-emitting diodes) 1212, a set of RJ-45 console ports 1214 (only one of which is shown for simplicity), and a NIC 1215 coupled to an interface plane connector 1216. Additional components include various passive components (i.e., resistors, capacitors), power conditioning components, and peripheral device connectors. Processor 1202 may typically comprise a multi-core processor having a System on a Chip (SoC) architecture.

Generally, each blade 1200 may also provide on-board storage. This is typically facilitated via one or more built-in disk controllers and corresponding connectors to which one or more disk drives 1218 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data. Disk drives 1218 may be Solid State Drives (SSDs), magnetic drives or optical drives. Optionally, other types of solid state mass storage devices may be used.

In a typical data center deployment, network switching elements comprise rack-mounted equipment, such as would occupy a 1 U, 2 U, or 4 U slot, or may be implemented via one or more server blades. Optionally, a network switching element may be implemented use one or more server blades.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

It is noted that the foregoing specified software and hardware are merely illustrative, as other versions of software and hardware may be employed to provide similar functionality to that described herein without departing from the scope and spirit of the invention.

Generally, aspects of the principles and teachings of the embodiments disclosed herein may be practice using hardware, software, or any combination of software and hardware, including use of software components, modules, and applications running on physical, such as a CPU of a computer or server, or virtual machines. In addition, embedded systems may be implemented to perform aspects of the embodiments, Thus, embodiments of this invention may be used as or to support a software program executed upon some form of processing core (such as the CPU of a computer) or otherwise implemented or realized upon or within a machine-readable medium. A machine-readable medium includes any tangible mechanism for storing information in a form readable by a machine (e.g., a computer, server, embedded system, etc.). For example, a machine-readable medium can include such as a read only memory (ROM); a random access memory (RAM); a magnetic disk storage media; an optical storage media; and a flash memory device, etc.

In the Figures, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

We claim:

1. A data migration method implemented by a server, comprising:
    receiving a selection of at least one of available domains for migration from a first server to a second server;
    determining whether the migration needs to be performed in either a passive migration mode or an active migration mode,
        wherein the determining is based at least in part on sufficiency of access privileges corresponding to the first server, and
        wherein migration in the active migration mode includes determining if there is a properly configured database at the second server and if not, establishing a properly configured database at the second server so that a replica of data to be migrated is generated at the second server; and
    migrating the at least one of the available domains from a database of the first server to a database of the second server using the determined mode.

2. The data migration method implemented by the server of claim 1, wherein the migrating comprising migrating the at least one of the available domains using an IP address of the at least one of the available domains from the database of the first server to the database of the second server.

3. The data migration method implemented by the server of claim 1, wherein the migrating comprising migrating the at least one of the available domains using a fully qualified domain name (FQDN) of a web site from the database of the first server to the database of the second server.

4. The data migration method implemented by the server of claim 3, further comprising deducing an IP address of the web site to migrate the at least one of the available domains using the FQDN from the database of the first server to the database of the second server.

5. The data migration method implemented by the server of claim 1, further comprising detecting the available domains associated with accounts.

6. The data migration method implemented by the server of claim 5, wherein the detecting the available domains includes accepting an inputted user list of individual domains with associated usernames and passwords.

7. The data migration method implemented by the server of claim 5, wherein the detecting the available domains includes accessing all domains associated with an administrative username and password on the first server.

8. The data migration method implemented by the server of claim 5, wherein the detecting the available domains includes screen-scraping domain data from a control panel of the first server accessed via a username, password, and IP address of the control panel.

9. The data migration method implemented by the server of claim 1, wherein the active migration mode includes accessing the first server via a secure shell connection.

10. The data migration method implemented by the server of claim 1, wherein the passive migration mode includes downloading files via File Transfer Protocol (FTP).

11. The data migration method implemented by the server of claim 9, wherein the active migration mode further includes migrating user selected database tables.

12. The data migration method implemented by the server of claim 11, wherein the migrating the user selected database tables include:
    running a dump command of the user selected database tables to create a database dump file;
    compressing the database dump file;
    recursively, for each httpdocs sub-directory, executing a tar command to wrap files associated with the domain into a single file; and
    compressing the single file.

13. A non-transitory computer-readable medium storing executable instructions that, in response to execution, cause a server computer to perform data migration operations, comprising:
    receiving a selection of at least one of available domains for migration from a first server to a second server;
    determining whether the migration needs to be performed in either a passive migration mode or an active migration mode,
        wherein the determining is based at least in part on sufficiency of access privileges corresponding to the first server, and
        wherein migration in the active migration mode includes determining if there is a properly configured database at the second server and if not, establishing a properly configured database at the second server so that a replica of data to be migrated is generated at the second server; and
    migrating the at least one of the available domains from a database of a first server to a database of a second server using the determined mode.

14. The non-transitory computer-readable medium storing executable instructions that, in response to execution, cause the server computer to perform the data migration operations of claim 13, wherein the migrating comprising migrating the at least one of the available domains using an IP address of the at least one of the available domains from the database of the first server to the database of the second server.

15. The non-transitory computer-readable medium storing executable instructions that, in response to execution, cause the server computer to perform the data migration operations of claim 13, wherein the migrating comprising:
    migrating the at least one of the available domains using a fully qualified domain name (FQDN) of a web site from the database of the first server to the database of the second server; and
    deducing an IP address of the web site to migrate the at least one of the available domains using the FQDN from the database of the first server to the database of the second server.

16. The non-transitory computer-readable medium storing executable instructions that, in response to execution, cause the server computer to perform the data migration operations of claim 13, further comprising detecting the available domains associated with user's accounts, wherein the detecting the available domains includes at least one of:
- accepting an inputted user list of individual domains with associated usernames and passwords;
- accessing all domains associated with an administrative username and password on the first server; and
- screen-scraping domain data from a control panel of the first server accessed via a username, password, and IP address of the control panel.

17. The non-transitory computer-readable medium storing executable instructions that, in response to execution, cause the server computer to perform the data migration operations of claim 13,
- wherein the active migration mode includes accessing the first server via a secure shell connection, and
- wherein the passive migration mode includes downloading files via File Transfer Protocol (FTP).

18. The non-transitory computer-readable medium storing executable instructions that, in response to execution, cause the server computer to perform the data migration operations of claim 17, wherein the active migration mode further includes migrating user selected database tables.

19. The non-transitory computer-readable medium storing executable instructions that, in response to execution, cause the server computer to perform the data migration operations of claim 18, wherein the migrating the user selected database tables include:
- running a dump command of the user selected database tables to create a database dump file;
- compressing the database dump file;
- recursively, for each http docs sub-directory, executing a tar command to wrap files associated with the domain into a single file; and
- compressing the single file.

* * * * *